(12) United States Patent
Watasue

(10) Patent No.: US 7,944,348 B2
(45) Date of Patent: May 17, 2011

(54) TIRE MONITORING DEVICE AND TIRE PROBLEM DETECTING DEVICE

(75) Inventor: Toshiaki Watasue, Yokohama (JP)

(73) Assignee: Texas Instruments Incorporated, Dallas, TX (US)

( * ) Notice: Subject to any disclaimer, the term of this patent is extended or adjusted under 35 U.S.C. 154(b) by 293 days.

(21) Appl. No.: 12/177,683

(22) Filed: Jul. 22, 2008

(65) Prior Publication Data

US 2009/0224902 A1    Sep. 10, 2009

(30) Foreign Application Priority Data

Jul. 25, 2007    (JP) ................................ 2007-193538

(51) Int. Cl.
*B60C 23/00* (2006.01)
(52) U.S. Cl. ........ 340/447; 340/612; 340/442; 73/146.2
(58) Field of Classification Search .................. 340/447, 340/442, 10.31, 10.34, 614; 73/146; 455/456.5
See application file for complete search history.

(56) References Cited

U.S. PATENT DOCUMENTS

| | | | | |
|---|---|---|---|---|
| 6,877,370 | B2* | 4/2005 | Masudaya | 73/146 |
| 7,336,163 | B2* | 2/2008 | Fujii | 340/447 |
| 7,683,769 | B2* | 3/2010 | Saitou et al. | 340/445 |
| 2002/0102995 | A1* | 8/2002 | Zelmanovich et al. | 455/456 |
| 2004/0017290 | A1* | 1/2004 | Boulot | 340/442 |
| 2005/0044946 | A1* | 3/2005 | Agrotis | 73/146.5 |

FOREIGN PATENT DOCUMENTS

JP    2003237329 A    8/2003
JP    2005088781 A    4/2005

* cited by examiner

*Primary Examiner* — Benjamin C Lee
*Assistant Examiner* — Peter C Mehravari
(74) *Attorney, Agent, or Firm* — William B. Kempler; Wade J. Brady, III; Frederick J. Telecky, Jr.

(57) ABSTRACT

A device to accurately identify the wheel position where each tire has a radio wave transmitter installed without special means or operation during application by using a simple and compact configuration. This TPMS has sensor modules 14A, 14B, 14C, 14D on the transmission side equipped by tires 12FL, 12FR, 12RL, 12RR installed on automobile 10 and main device 16 on the receiving side loaded in automobile 10. Main device 16 is comprised of a group of two antennas 18, 20, receiver 22, and display 24. Two antennas 18, 20 are arranged appropriately to receive the radio waves transmitted by each of sensor modules 14A-14D with a phase difference between them.

18 Claims, 8 Drawing Sheets

TIRE MONITORING DEVICE AND TIRE PROBLEM DETECTING DEVICE

FIELD OF THE INVENTION

The present invention pertains to a tire monitoring device and a tire problem detecting device that can monitor the state of tires installed on the wheels of an automobile in a wireless form. In particular, the present invention pertains to technology that improves the function of identifying the installation position of each tire acting as a radio wave transmitter.

BACKGROUND OF THE INVENTION

In recent years, practical application of a TPMS (tire pressure monitoring system) has attracted a lot of attention as car electronics technology for guaranteeing safety and comfort of an automobile with regard to the tires. TPMSs can be roughly classified into a direct measurement type that directly measures the air pressure in each tire and an indirect measurement type that detects insufficient air pressure from the rotation speed difference of two wheels.

FIGS. 9-11 show a conventional typical direct measurement type TPMS.

The TPMS shown in FIG. 9 has receiving antennas 104A, 104B, 104C, 104D with relatively low sensitivity arranged in wheel housings or at other places close to tires 102FL, 102FR, 102RL, 102RR installed on automobile 100. Each of receiving antennas 104A-104D is connected to receiver 106 via respective power supply lines. Tires 102FL, 102FR, 102RL, 102RR are equipped with various kinds of sensors used for detecting air pressure, temperature, etc., of the corresponding tires and sensor modules 108A, 108B, 108C, 108D having transmitters, etc., that transmit the data of the sensor measurement results through radio waves with a certain frequency (such as 315 MHz), respectively. When receiver 106 selects the radio waves input from one of receiving antennas 104A-104D, the sensor module 108 corresponding to or close to that receiving antenna 104 is selected, and the tire state information (air pressure measurement value, temperature measurement value, etc.) sent through a wireless RF signal from said sensor module 108 is input and demodulated. If the measurement value is outside an allowed range, it means that the corresponding tire 102 has a problem or is abnormal, and a warning will be sent through display 110 in the automobile.

The TPMS shown in FIG. 10 has starting antennas 110A, 110B, 11C, 110D arranged close to tires 102FL, 102FR, 102RL, 102RR, respectively, and has only one receiving antenna 104. Each of said starting antennas 110A-110D and receiving antenna 104 are connected to receiver 106 via respective power supply lines. Receiver 106 operates starting antenna 110 close to selected tire 102 in order to monitor the state of each of tires 102FL-102RR. A start signal or request signal with a low frequency (for example, 125 kHz) is supplied to the sensor module 108 of that tire 102 using the electromagnetic induction method, and the tire state information transmitted wirelessly (RF signal) from the corresponding sensor module 108 is input corresponding to said request signal.

The TPMS shown in FIG. 11 does not have antennas arranged close to tires 102FL, 102FR, 102RL, 102RR and has only one receiving antenna 104. In this case, however, ID information transmitted together with the tire state information from the sensor module 108 of each tire 102 is set and registered in receiver 106 in relation to the installation position of the corresponding tire 102. Receiver 106 demodulates the radio waves received by receiving antenna 104 and reads the ID. In this way, it is possible to determine the wheel position where tire 102 is installed as the radio wave transmitter based on the set registration information.

For the aforementioned conventional direct measurement type TPMSs, there are problems in configuration or use with regard to the function of identifying the installation position of each tire as a radio wave transmitter. That is, for TPMSs shown in FIGS. 9 and 10, since receiving antennas 104A, 104B, 104C, 104D or starting antennas 110A, 110B, 110C, 110D are arranged close to tires 102FL, 102RL, 102RL, 102RR, respectively, the number of parts is increased, and the configuration of the entire device is complicated. The cost of the device is also increased. The TPMS shown in FIG. 11 has a simple configuration since the number of parts is reduced. However, every time a tire on a wheel is replaced, it is necessary to set and register the installation wheel position of the newly installed tire corresponding to the ID information in receiver 106. The work required for application is a bottleneck.

An object of the present invention is to solve the problems of the aforementioned conventional technology by providing a tire monitoring device and a tire problem detecting device, which have a simple configuration and compact size, require no special means or operation during operation, and can accurately identify the wheel position where each tire as a radio wave transmitter is installed.

SUMMARY OF THE INVENTION

This and other objects and features are provided according to an aspect of the present invention having a tire monitoring device that monitors the state of tires based on information included in radio waves transmitted from sensor modules equipped by the tires installed on the wheels of an automobile. It has first and second antennas installed at different positions on the body of said automobile to receive the radio waves transmitted from said sensor modules with a phase difference between them, a received radio wave phase difference detector that detects the phase difference between the radio waves received by the first and second antennas, and a tire wheel position judging part that judges the wheel position where a tire is installed as the transmitter of said radio waves based on the phase difference between said received radio waves.

In one aspect of the tire monitoring device of the present invention, common first and second antennas are arranged in a prescribed positional relationship on all the tires installed on an automobile. Numerous equal phase difference curves are defined unambiguously in a profile corresponding to the wavelength of the radio waves and the distance between the two antennas. In other words, each wheel of the automobile is arranged on a prescribed equal phase difference curve based on the relative position with respect to the two antennas. In this way, the position of the radio wave transmitter on the equal phase difference curve can be calculated from the phase difference between the radio waves received by the two antennas obtained by the received radio wave phase difference detector. It is possible to determine the wheel position where the tire as the radio wave transmitter is installed in the tire wheel position judging part.

According to an aspect of the present invention, said first and second antennas are arranged in a prescribed positional relationship such that different wheels of said automobile are set at different positions on equal phase difference curves specified between the first and second antennas and around them. In this configuration, it is possible to determine the position of each tire as a radio wave transmitter from the phase difference between the received radio waves for all four wheels.

In an aspect of said configuration, said first and second antennas are arranged such that the straight line connecting the first and second antennas is neither parallel with nor perpendicular to but is inclined by a prescribed angle with respect to each side of the quadrilateral that connects the center of each of the four wheels of said automobile.

In an aspect of said configuration, said first and second antennas are arranged such that the straight line connecting the first and second antennas is parallel with the width direction of said automobile and is offset in the length direction of said automobile toward the front wheels or rear wheels from the center of the quadrilateral that connects the center of each of the four wheels of said automobile.

In an aspect of said configuration, said first and second antennas are arranged such that the straight line connecting the first and second antennas is parallel with the length direction of said automobile and is offset in the width direction of said automobile toward the left wheels or right wheels from the center of the quadrilateral that connects the center of each of the four wheels or said automobile.

In an aspect, said first and second antennas are arranged in a prescribed positional relationship such that the front and rear wheels of said automobile are set at different positions on equal phase difference curves specified between the first and second antennas and around them. In this case, it is preferred that the sensor module equipped by each tire include a rotation direction sensor that can detect whether the rotation direction of that tire is clockwise or counterclockwise from the shaft of the wheel in order to determine whether the tire as the radio wave transmitter is the left wheel or right wheel.

As another aspect, said first and second antennas are arranged in a prescribed positional relationship such that the left and right wheels of said automobile are set at different positions on equal phase difference curves specified between the first and second antennas and around them. In this case, it is preferred that the means used for judging whether the tire as the radio wave transmitter is installed on a front wheel or a rear wheel be provided separately.

According to an aspect, said sensor module includes a pressure sensor that detects the air pressure of the tire, a temperature sensor that detects the temperature of the tire, etc. Also, it is preferred that the first and second antennas be arranged at a distance shorter than the wavelength of said radio waves, especially at a distance equal to ¼ of the wavelength of said radio waves.

Also, according to an aspect, said received radio wave phase difference detector has a first intermediate frequency converting circuit that converts the radio waves received by the first antenna to a first intermediate frequency signal having a prescribed intermediate frequency lower than the frequency of said radio waves, a first amplifier circuit that amplifies the first intermediate frequency signal, a second intermediate frequency converting circuit that converts the radio waves received by the second antenna to a second intermediate frequency signal having said intermediate frequency, a second amplifier circuit that amplifies said second intermediate frequency signal, and a phase detecting circuit that detects the phase difference between the first intermediate frequency signal output from the first amplifier circuit and the second intermediate frequency signal output from the second amplifier circuit.

Also, according to an aspect, said wheel judging part has a phase difference reference value setting part that sets and stores a phase difference reference value for each wheel in advance based on equal phase difference curves specified between the first and second antennas and a judging part that compares the detected phase difference value between the received radio waves obtained from said received radio wave phase difference detector with the phase difference reference value of each wheel, determines the phase difference reference value closest to said detected phase difference value, and judges the wheel corresponding to said determined phase difference reference value as the wheel whereon the tire of said radio wave radiation source is installed.

An aspect of the tire problem detecting device disclosed in the present invention can detect a prescribed problem when it occurs on a tire installed on any wheel of an automobile based on the information included in the radio waves transmitted from a sensor module equipped by said tire. It has first and second antennas installed at different positions on the body of said by said tire. It has first and second antennas installed at different positions on the body of said automobile to receive the radio waves transmitted from said sensor module with a phase difference between them, a phase difference detector that detects the phase difference between the radio waves received by the first and second antennas, and a problem tire wheel position identification part that can identify which wheel has the tire with said prescribed problem.

In an aspect of the tire problem detecting device of the present invention, common first and second antennas are also arranged in a prescribed positional relationship on all the tires installed on an automobile. Numerous equal phase difference curves are defined unambiguously in a profile corresponding to the wavelength of the radio waves and the distance between the two antennas. In other words, each wheel of the automobile is arranged on a prescribed equal phase difference curve based on the relative position with respect to the two antennas. In this way, the position of the radio wave transmitter on the equal phase difference curve can be calculated from the phase difference between the radio waves received by the two antennas obtained by the received radio wave phase difference detector. It is possible to determine the wheel position where the tire with a problem is installed in the problem tire wheel position identification part.

REFERENCE NUMERALS AND SYMBOLS AS SHOWN IN THE DRAWINGS

In the figures, 10 represents an automobile, FL a front left wheel, FR a front right wheel, RL a rear left wheel, RR a rear right wheel, 12FL a front left wheel tire, 12FR a front right wheel tire, 12RL a rear left wheel tire, 12RR a rear right wheel tire, 14A, 14B, 14C, 14D a sensor module, 16 a main device, 18, 20 a receiving antenna, 22 a receiver, 24 a display, 26 a receiving unit, 30, 32 a mixing circuit, 34 a local oscillating circuit, 36, 38 an intermediate frequency amplifier circuit, 40, 42 a discriminator circuit, 44 a phase detecting circuit, 46 a signal processing circuit.

DESCRIPTION OF THE EMBODIMENTS

The tire monitoring device and tire problem detecting device of an aspect of the present invention are simple and compact and require no special means or operation during application and can accurately identify the wheel position where each tire or a tire with a problem acting as a radio wave transmitter is installed.

In the following, embodiments of the present invention will be explained with reference to FIGS. 1-8.

Figure 1:
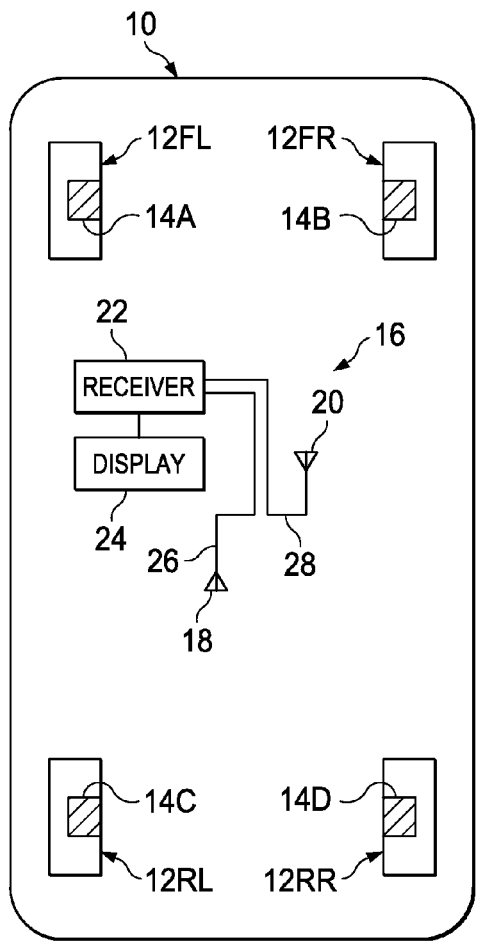
FIG. 1 is a plan view schematically illustrating the overall configuration of a TPMS disclosed in an embodiment of the present invention.

FIG. 1 shows the overall configuration of the TPMS disclosed in an embodiment of the present invention. Said TPMS is constituted as a direct measurement type wireless transmission-receiving device. It has sensor modules 14A, 14B, 14C, 14D on the transmission side equipped by tires 12FL, 12FR, 12RL, 12RR installed on a four-wheel automobile 10 as well as main device 16 on the receiving side installed or loaded as the TPMS main body in automobile 10.

In this case tire 12FL is installed on the front left wheel FL, tire 12FR is installed on the front right wheel FR, tire 12RL is installed on the rear left wheel RL, and tire 12RR is installed on rear right wheel RR. Each sensor module 14 may have any configuration/function as long as it is of the direct measurement type. For example, it can have various kinds of sensors used for detecting the air pressure, temperature, power supply voltage, etc., of the corresponding tire and a transmitter, etc., that transmits the data of the sensor measurement result through radio waves with a certain frequency (for example, 315 MHz). The sensor module is installed or incorporated integrally in the plug of the corresponding tire. Since all sensor modules 14A, 14B, 14C, 14D operate (transmit) repeatedly in random periods, the transmissions of the radio waves from plural sensor modules 14 are superimposed on each other over time. The radio waves (tire state information) transmitted from each sensor module 14 are received independently or selectively by main device 16. Also, a battery acting as the power supply is incorporated in each sensor module. However, it is also possible to use electromagnetic energy supplied from outside as the power supply instead of using said incorporated battery.

Main device 16 is comprised of two receiving antennas 18, 20, receiver 22, and display 24. Said two receiving antennas 18, 20 are installed, for example, on the bottom of the body within the frame of quadrilateral S that connects the four wheels (FL, FR, RL, RR) of automobile 10 so that they can receive the radio waves transmitted from each of sensor modules 14A, 14B, 14C, 14D with a phase difference. Receiver 22 is connected to two antennas 18, 20 via power supply lines 26, 28. It can be installed at any position in the body or in the automobile compartment. Display 24 can use any display device or display element, such as a liquid crystal display or light emitting diode (lamp). It is usually installed on the driver's side in the automobile compartment.

Figure 3:
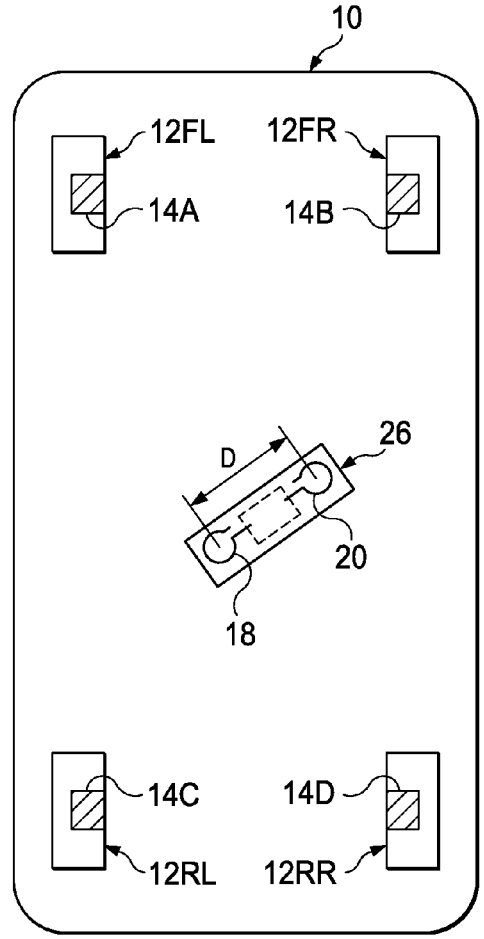
FIG. 3 is a diagram illustrating a configuration example that loads the receiving unit shown in FIG. 2 in an automobile.
Figure 2:
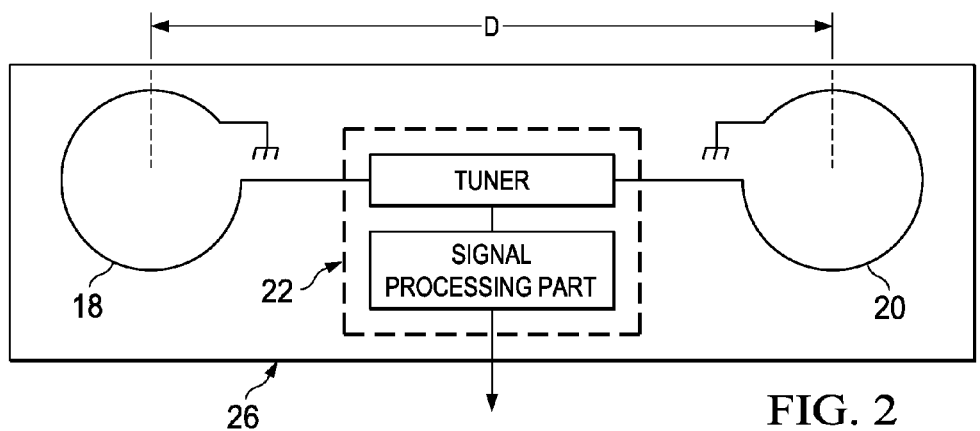
FIG. 2 is a diagram illustrating a configuration example that combines the receiving antennas and the receiver in one unit in the TPMS of said embodiment.

FIG. 2 shows an example of assembly of the antennas 18, 20 and receiver 22 of main device 16 into one unit 26 as a receiving module. As shown in the figure, in receiving unit 26, antennas 18, 20 are loop antennas with the same configuration and are arranged at a certain distance D (for example, D=$\lambda$/4, where $\lambda$ is the wavelength of the radio waves transmitted by the sensor module) in the horizontal direction. Receiver 22 is installed near the central position between two antennas 18, 20. It is also possible to arrange the signal processing part of the back end in the empty space above unit 26. For example, receiving unit 26 can be installed on the bottom of the body of automobile 10 at a prescribed position in a prescribed direction as shown in FIG. 3.

Figure 4:
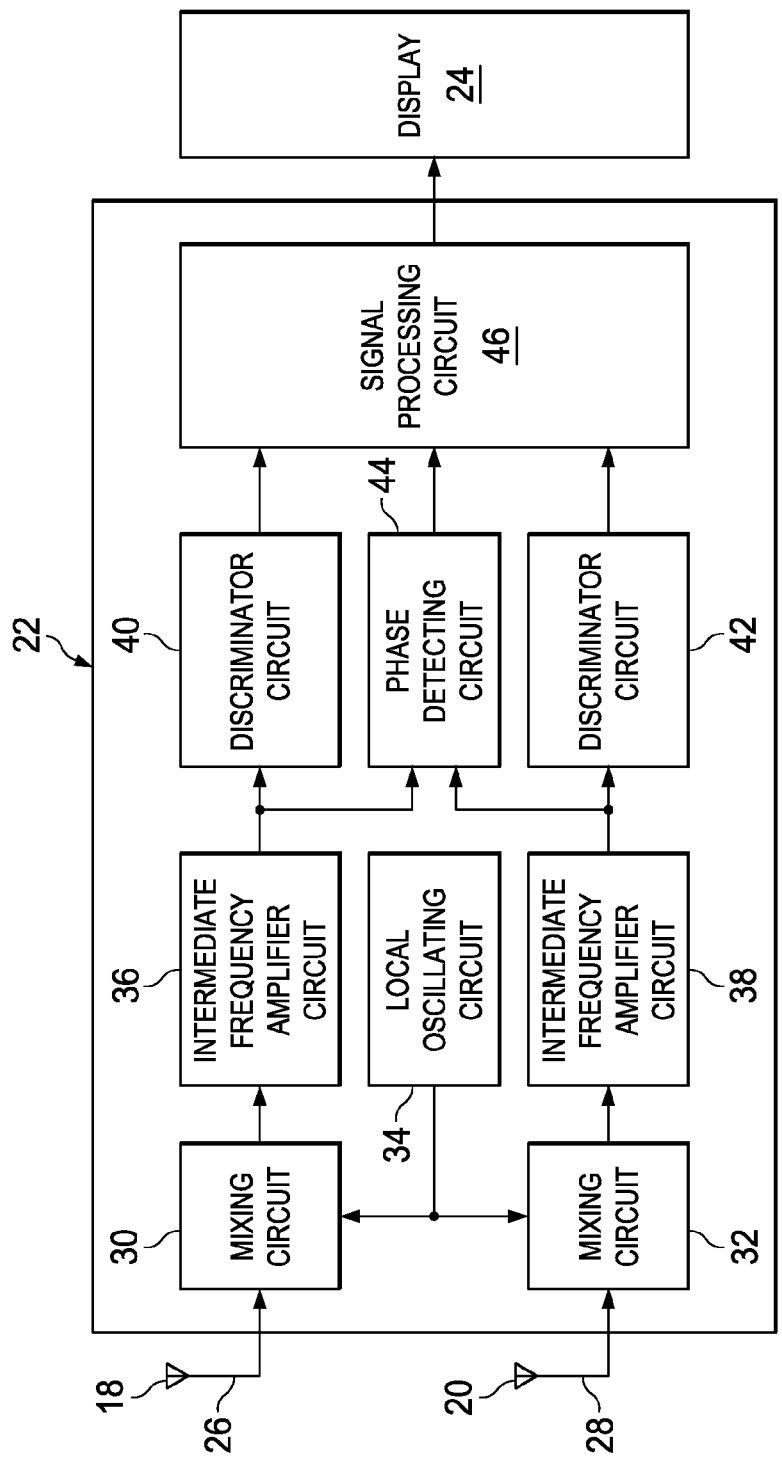
FIG. 4 is a block diagram illustrating a circuit configuration example of the receiver in the TPMS of the embodiment.

FIG. 4 shows a circuit configuration example of receiver 22. Said receiver 22 has mixing circuits 30, 32, local oscillator circuit 34, intermediate frequency amplification circuits 36, 38 at the front end and has discriminator circuits 40, 42, phase difference detecting circuit 44, and signal processing circuit 46 at the back end.

At the front end, the first mixing circuit 30 mixes the local oscillator signal output from local oscillating circuit 34 with the RF signal of the radio waves received by or input to the first antenna 18 and outputs a first intermediate frequency signal having a frequency (intermediate frequency) equal to the difference between the frequencies of said two signals. The first intermediate frequency signal is amplified at a prescribed gain by the first intermediate frequency amplification circuit 36 and is then input into the first discriminator circuit 40 and phase detecting circuit 44.

On the other hand, the second mixing circuit 32 mixes the local oscillator signal output from local oscillating circuit 34 with the RF signal of the radio waves received by or input to the second antenna 20 and outputs a second intermediate frequency signal having said intermediate frequency. The second intermediate frequency signal is amplified at a prescribed gain by the second intermediate frequency amplification circuit 38 and is then input into the second discriminator circuit 42 and phase difference detecting circuit 44.

At the back end, the first and second discriminator circuits 40, 42 demodulate with a prescribed data transmission method, for example, FSK (frequency shift keying), the first and second intermediate frequency signals and send the output digital signals to signal processing circuit 46. Since a common transmission source is used for the detection objects of the radio waves received by two antennas 18, 20, the contents of the data obtained by detecting and demodulating them (the air pressure measurement value, temperature measurement value, voltage measurement value, etc., of the tire) are also common. Consequently, it is also possible to only input one of the output signals of two discriminator circuits 40, 42 into signal processing circuit 46.

Phase detecting circuit 44 detects the phases of the first and second intermediate frequency signals and compares the two phases to detect the difference (phase difference) and supplies the phase difference detection value to signal processing circuit 46.

Since the phases of the RF signals received by two antennas 18, 20 are reflected in the phases of the first and second intermediate frequency signals, the phase difference between the two radio waves can be derived from the phase difference between the first and second intermediate frequency signals. As a modification example, it is also possible to drive said phase difference by inputting the RF signals of the two received radio waves into phase detecting circuit 44.

Signal processing circuit 46 can be constituted by a CPU (central processing unit) or DSP (digital signal processor). It compares the tire state information (air pressure measurement value, temperature measurement value, voltage measurement value, etc.) included along with the tire ID information in the demodulated data with each monitor reference voltage (reference air pressure, reference temperature, reference voltage, etc.) to determine whether the concerned tire operates normally and sends the judgment result to the user (driver) through display 24.

Signal processing circuit 46 determines the wheel position (FL, FR, RL, or RR) where tire 12 as the radio wave transmitter is installed based on the phase difference detection value input from phase detecting circuit 44 and phase difference set registration information to be described later and displays said wheel position on display 24. In this way, if the air pressure drops below the safe reference value in one tire, for example, tire 12FR, the wheel position of tire 12FR (that is, front right wheel RF) can be notified along with said problem situation (insufficient air pressure) to the driver.

In the following, the relationship between the arrangement configuration of two antennas 18, 20 and the equal phase difference curves specified between the two antennas in an embodiment will be explained based on FIGS. 5, 6.

Figure 5:
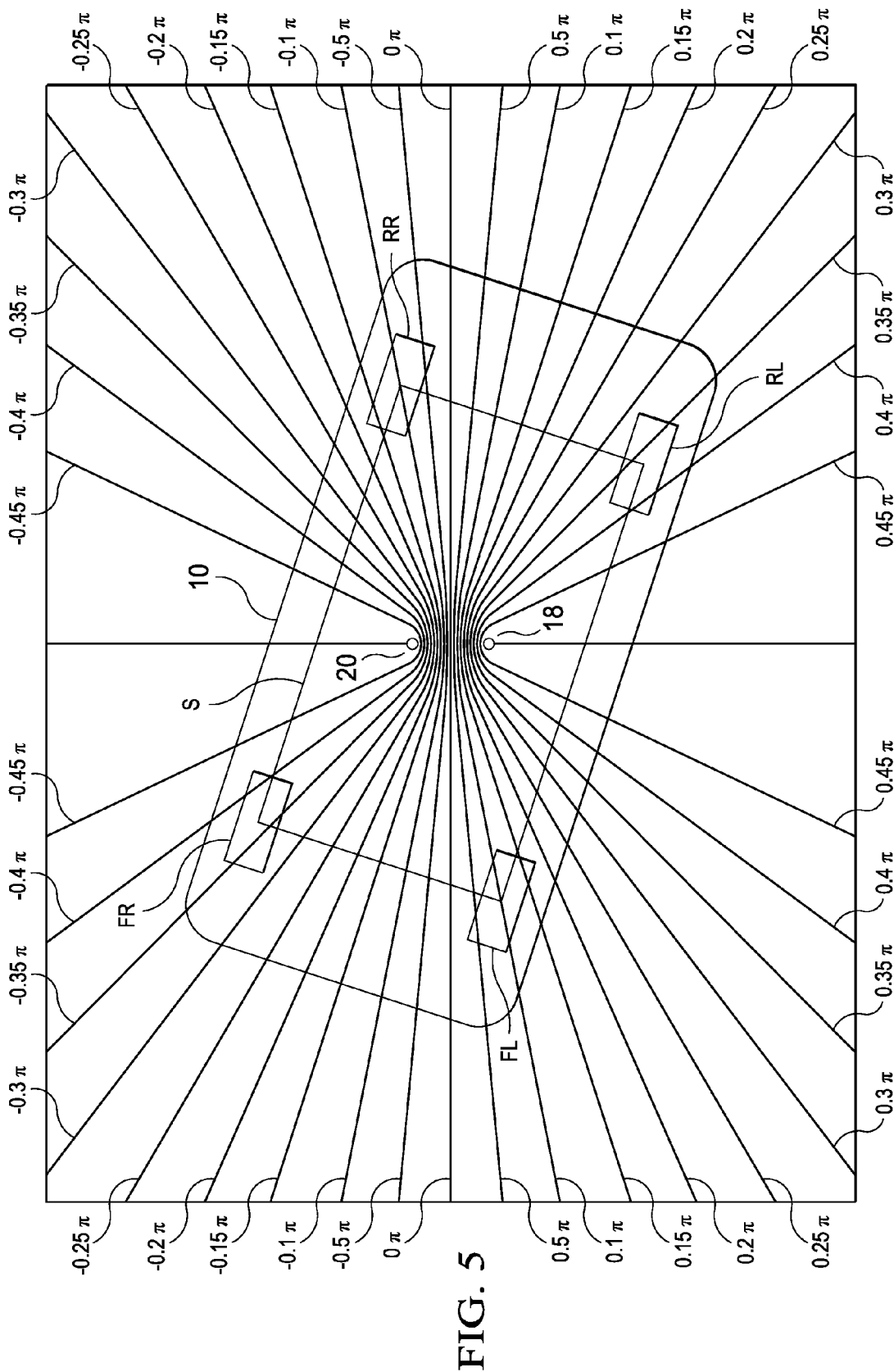
FIG. 5 is a diagram illustrating the antenna arrangement according to an embodiment and the equal phase difference curves between the two antennas.
Figure 6:
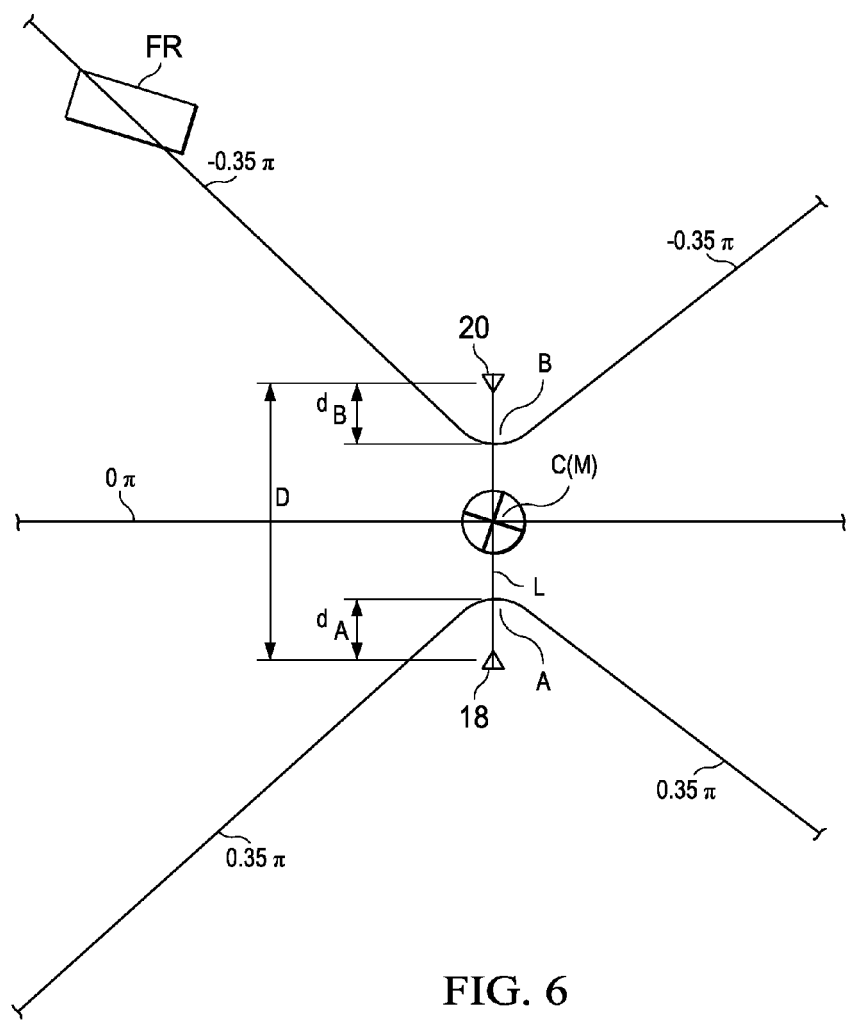
FIG. 6 is a partial enlarged view that enlarges a part of FIG. 5.

As shown in FIG. 5, numerous equal phase difference curves between said antennas 18, 20 and around them are defined unambiguously in a profile based on the wavelength of the radio waves and the distance D between the two antennas. More specifically, the equal phase difference curve with phase difference of $0\pi$ is specified on the straight line that crosses perpendicular to the straight line L formed by connecting two antennas 18, 20 and passes through central point C. Then, as the phase difference increases in the positive direction as $0.05\pi \to 0.1\pi \to 0.15\pi \to \ldots 0.4\pi \to 0.45\pi$, the equal phase difference curve is bent at bigger curvature and approaches the side of antenna 18. As the phase difference increases in the negative direction as $-0.05\pi \to -0.1\pi \to -0.15\pi \to \ldots -0.4\pi \to -0.45\pi$, the equal phase difference curve is bent at high curvature and approaches the side of antenna 20. The distance D between two antennas 18, 20 is selected to be equal to ¼ wavelength, that is, $D=\lambda/4$ ($\lambda$ represents the wavelength of the radio waves).

All the equal phase difference curves cross the straight line L that connects two antennas 18, 20. For example, if the pair of equal phase difference curve of phase difference of $0.35\pi$ and equal phase difference curve of $-0.35\pi$ shown in FIG. 6 is taken as the example, the curve of $0.35\pi$ crosses straight line L at point A at a distance $d_A=\lambda/16$ from antenna 18, and the curve of $-0.35\pi$ crosses straight line L at point B at distance $d_B=\lambda/16$ from antenna 20.

In the embodiment shown in FIG. 5, two antennas 18, 20 are arranged such that straight line L that connects two antennas 18, 20 inclines at an appropriate angle without being parallel with or perpendicular to any side of quadrilateral S within the area of quadrilateral S that connects four wheels (FL, FR, RL, RR) of automobile 10. Also, the central point C between two antennas 18, 20 is consistent with the central point M of quadrilateral S. In this way, front left wheel FL is positioned in the range of about $[0\pi$ to $0.25\pi]$, front right wheel FR is positioned in the range of about $[-0.3\pi$ to $-0.45\pi]$, rear left wheel RL is positioned in the range of about $[0.3\pi$ to $0.4\pi]$, and rear right wheel RR is positioned in the range of about $[0\pi$ to $-0.15\pi]$. The positions of four wheels (FL, FR, RL, RR) on the equal phase difference curves are set appropriately so that they do not superimpose with each other even partially. Then, the setting content, that is, the position information of each wheel on the equal phase difference curves is registered (stored) as one piece of setting information in the memory of receiver 22.

During use, in receiver 22, the phase difference of the radio waves (RF signals) received by two antennas 18, 20 are detected by phase detecting circuit 44 as described above, and the value of the phase difference is supplied to signal processing circuit 46. During travel of automobile 10, since each sensor module 14 acting as the radio wave transmitter rotates along with the corresponding tire 12, that is, moves periodically within a certain range on the equal phase difference curves, the detected value of the phase difference obtained by phase detecting circuit 44 also varies periodically within a certain range.

Signal processing circuit 46 compares the phase difference detected value received from phase detecting circuit 44 with each piece of wheel position information on the equal phase difference curves registered in the memory and derives the wheel position set in the phase difference range that is closest to the phase difference detected value (strictly speaking, said periodically varying range). For example, if the phase difference detected value sent from phase detecting circuit 44 varies near $-0.35\pi$, the radio wave transmitter can be identified as tire 12FR (sensor module 14B) of front right wheel FR. Then, if, for example, the tire air pressure in the tire state information supplied from discriminator circuit 40, 42 falls below the safety reference value, the fact that a problem of insufficient air pressure occurs in the tire 12FR of front right wheel FR can be notified instantaneously to the driver through display 24.

Signal processing circuit 46 can also perform statistical processing or averaging processing for each tire (ID) for the phase difference detected value received from phase detecting circuit 44 to improve the accuracy and reliability of the phase difference detected value regarding each tire.

As described above, for the TPMS disclosed in this embodiment, an antenna does not have to be installed near tires 12FL, 12FR, 12RL, 12RR. Only a group of two (18, 20) antennas are used commonly for all the tires, and work during operation is not necessary. In particular, registration of the position of a wheel whereon a new tire is installed corresponding to the tire ID is not necessary when a tire is replaced on any of four wheels (FL, FR, RL, RR).

Figure 7:
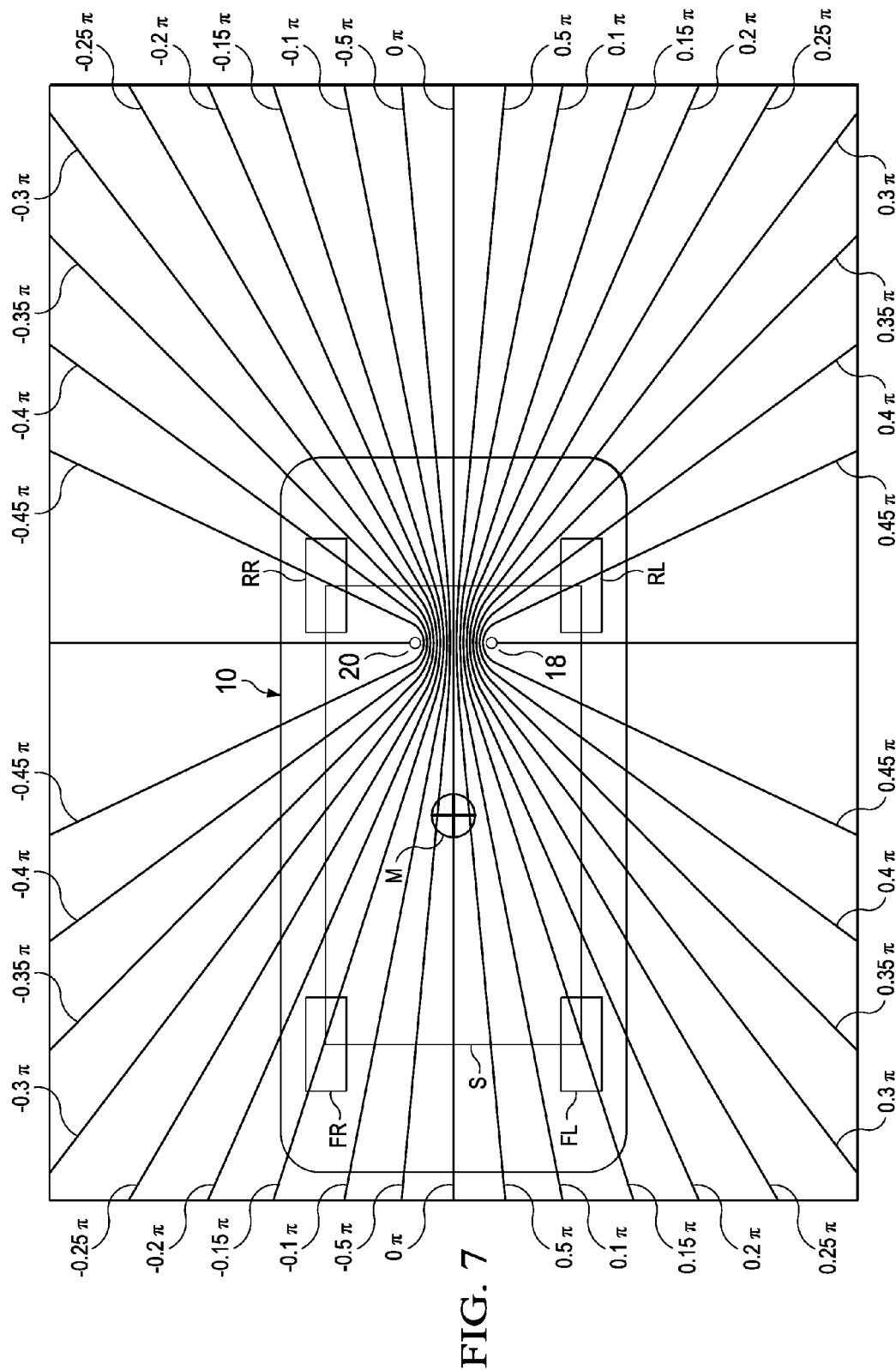
FIG. 7 is a diagram illustrating the antenna arrangement according to another embodiment and the equal phase difference curves between the two antennas.
Figure 8:
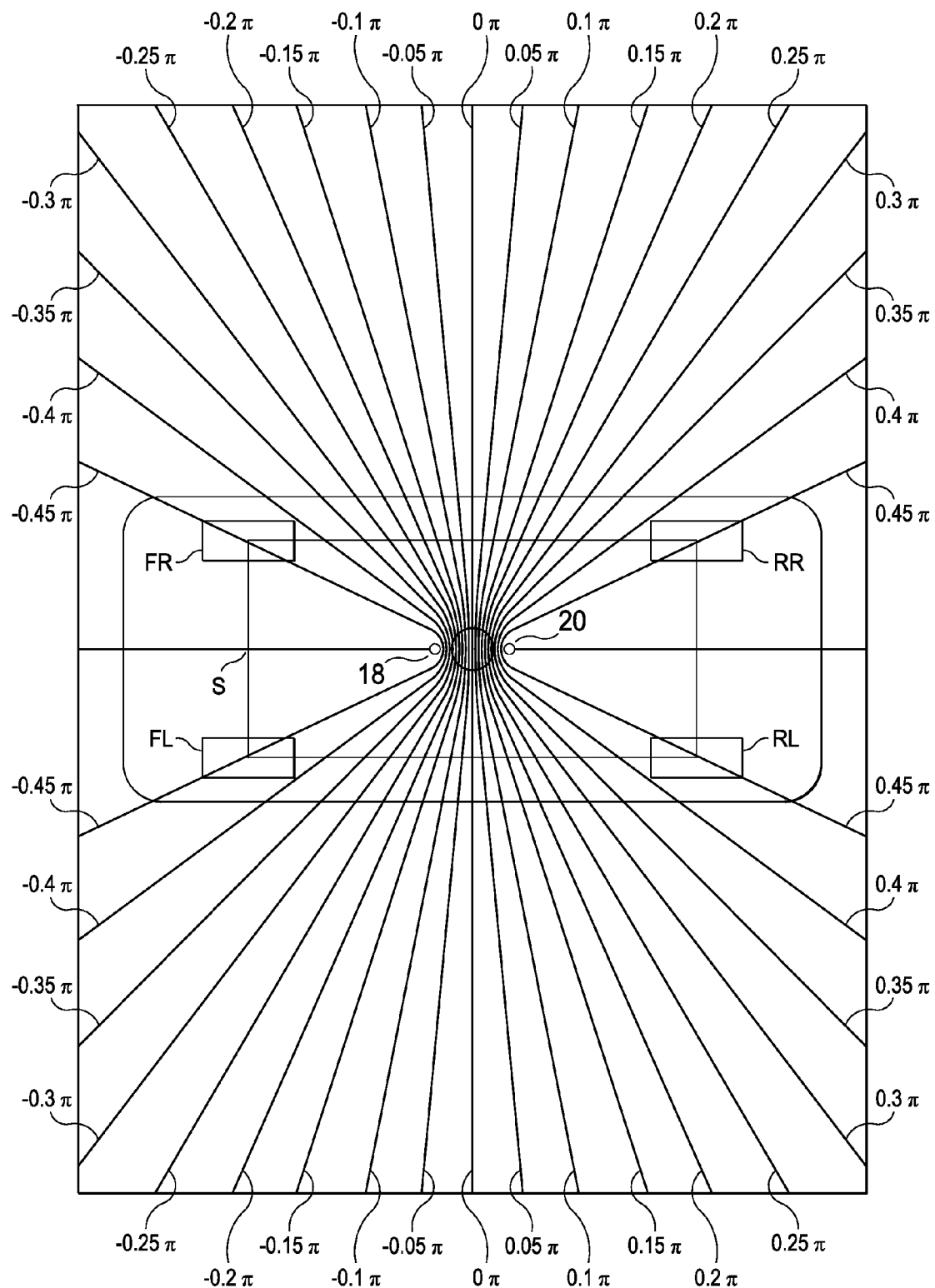
FIG. 8 is a diagram illustrating the antenna arrangement according to yet another embodiment and the equal phase difference curves between the two antennas.
Figure 9:
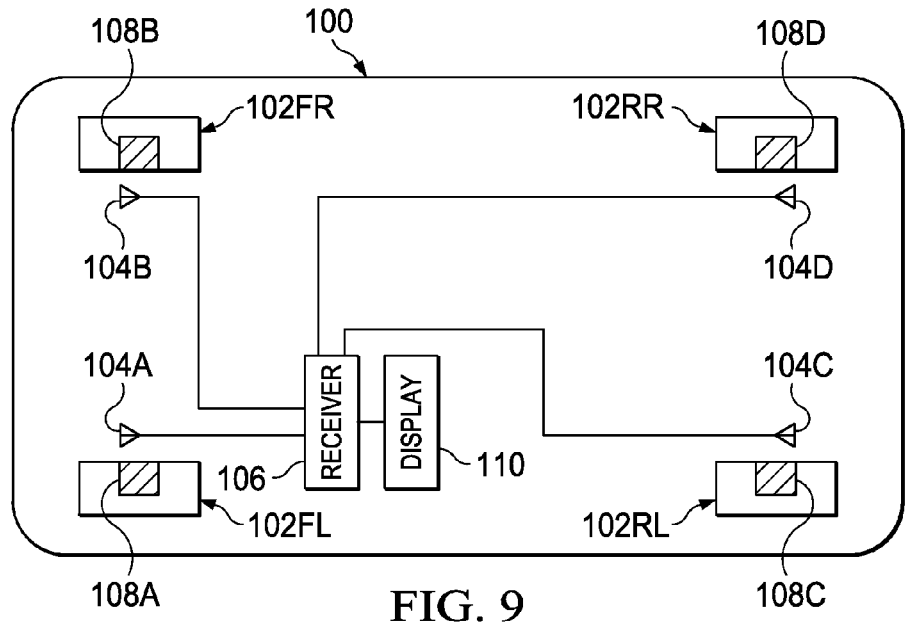
FIG. 9 is a diagram illustrating a conventional example of a direct measurement type TPMS.
Figure 10:
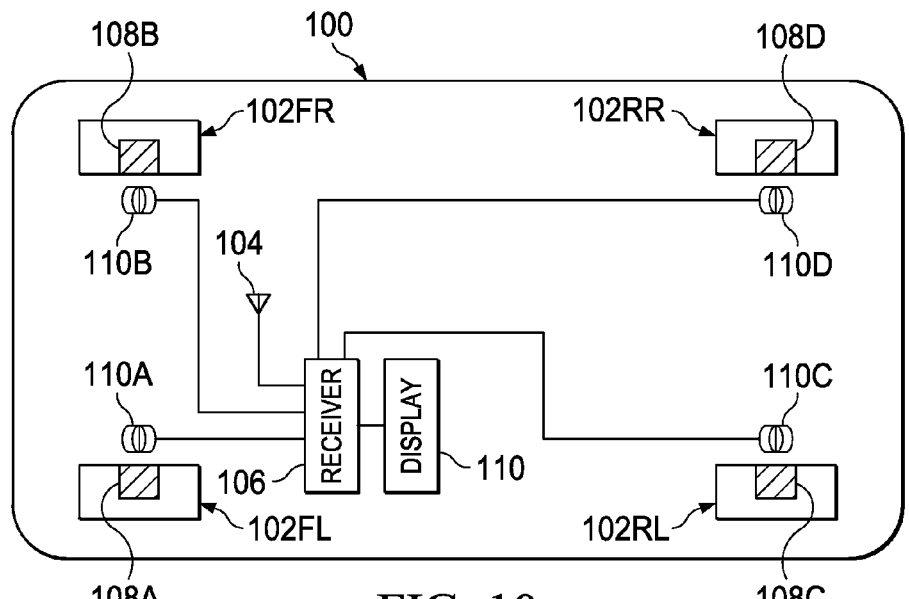
FIG. 10 is a diagram illustrating another conventional example of a direct measurement type TPMS.
Figure 11:
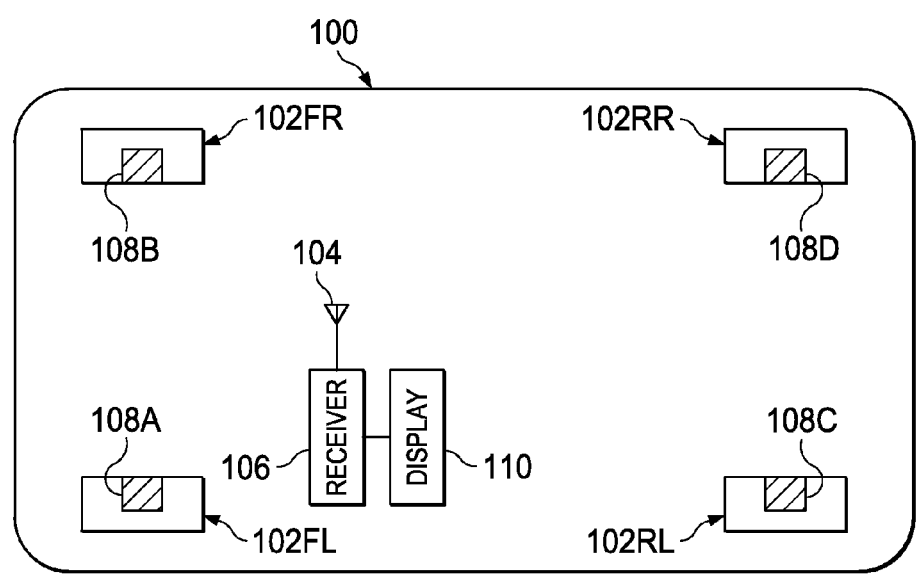
FIG. 11 is a diagram illustrating yet another conventional example of a direct measurement type TPMS.

FIGS. 7, 8 show other embodiments regarding the arrangement of two antennas 18, 20 in these embodiments.

In the embodiment shown in FIG. 7, two antennas 18, 20 are arranged such that straight line L that connects two antennas 18, 20 is parallel with the width direction of automobile 10 and is offset in the length direction toward the rear wheels from the central point M of the four wheels. As shown in the figure, front left wheel FL is positioned in the range of about $[0.1\pi$ to $0.2\pi]$, front right wheel FR is positioned in the range of about $[-0.1\pi$ to $-0.2\pi]$, rear left wheel RL is positioned in the range of about $[0.3\pi$ to $0.45\pi]$, and rear right wheel RR is positioned in the range of about $[-0.3\pi$ to $-0.45\pi]$. In this case, the positions of four wheels (FL, FR, RL, RR) on the equal phase difference curves are also set without partial superimposition. Consequently, during operation, the same effect as that of said receiver 22 can be realized.

As a modification example of the embodiment shown in FIG. 7, said two antennas 18, 20 can be arranged such that the straight line L that connects two antennas 18, 20 is offset toward the front wheels from the central point M of the four wheels. As another modification example, two antennas 18, 20 are arranged such that the straight line L that connects two antennas 18, 20 is parallel with the length direction of automobile 10 and is offset in the width direction toward the left wheels or right wheels from the central point M of the four wheels.

In the embodiment shown in FIG. 8, two antennas 18, 20 are arranged such that the front wheels (FL, FR) and rear wheels (RL, RR) of the automobile are set at different positions on the equal phase difference curves specified between two antennas 18, 20. In the example shown in the figure, the straight line L that connects antennas 18, 20 is parallel with the length direction of automobile 10, and the central point C of straight line L is consistent with the central point M of the four wheels. By arranging the antennas this way, as shown in the figure, both front left wheel FL and front right wheel FR are positioned close to the range of about [−0.4π to −0.45π], and both rear left wheel RL and rear right wheel RR are positioned close to the range of about [0.4π to 0.45π]. The positions of front wheels (FL, FR) and the positions of rear wheels (RL, RR) on the equal phase difference curve are set without superimposition between them.

In this case, signal processing circuit 46 can judge or distinguish whether the tire of the radio wave transmitter is front wheel (FL, FR) or rear wheel (RL, RR) by comparing the phase difference detected value supplied from phase detecting circuit 44 with the set registered information regarding each wheel position on the equal phase difference curves.

On the other hand, it is possible to take advantage of the direction detecting function of sensor module 14 in order to determine whether the tire of the radio wave transmitter is left wheel (FL, RL) or right wheel (FR, RR). In other words, the direct measurement type sensor module may also include a rotation direction sensor that detects the rotation direction of the concerned tire (clockwise direction or counterclockwise direction viewed from the shaft of the wheel) by using a pair of gravity detecting sensors and sends the detected rotation direction along with other tire state information, such as tire air pressure or tire temperature. In this case, signal processing circuit 46 can extract the information of the tire rotation direction from the data received from discriminator circuit 40, 42, identify the rotation direction of the tire as the radio wave transmitter, and determine whether the concerned tire is a left wheel or right wheel. In this way, it is possible to determine or distinguish which of the four wheels (FL, FR, RL, RR) is the installation location of the tire as the radio wave transmitter based on the received radio wave phase difference information and the tire rotation direction.

As a modification example of the embodiment shown in FIG. 8, two antennas 18, can be arranged such that the left wheels (FL, RL) and right wheels (FR, RR) of the automobile are set at different positions on the equal phase difference curves specified between two antennas 18, 20.

Preferable embodiments of the present invention have been explained above. The present invention, however, is not limited to these embodiments. It is possible to make various modifications within the range of the technical idea of the present invention. For example, the distance D between two antennas 18, 20 is set at 1 wavelength of the radio waves in the aforementioned embodiments. Said distance can also be set differently, preferably, in the range of 0<D<π. Also, it is possible to add an amplifier circuit in the earlier stage of mixing circuits 30, 32 in receiver 22.

The invention claimed is:

1. A tire monitoring device that monitors the state of tires based on information included in radio waves transmitted from sensor modules equipped tires installed on the wheels of an automobile, comprising:

first and second antennas installed at different positions on the body of said automobile to receive the radio waves transmitted from said sensor modules with a phase difference between them , wherein said first and second antennas are arranged in a prescribed positional relationship such that different wheels of said automobile are set at different positions on equal phase difference curves specified in a quadrilateral that connects the center of each of the four wheels of said automobile;

a received radio wave phase difference detector that detects the phase difference between the radio waves received by the first and second antennas; and a tire wheel position judging part that judges the wheel position where a tire is installed as the transmitter of said radio waves based on the phase difference between said received radio waves.

2. The tire monitoring device described in claim 1, wherein said first and second antennas are arranged such that the straight line connecting the first and second antennas is neither parallel with nor perpendicular to but is inclined by a prescribed angle with respect to each side of the quadrilateral that connects the center of each of the four wheels of said automobile.

3. The tire monitoring device described in claim 2 wherein the first and second antennas are arranged at a distance shorter than the wavelength of said radio waves.

4. The tire monitoring device described in claim 1, wherein said first and second antennas are arranged such that the straight line connecting the first and second antennas is parallel with the width direction of said automobile and is offset in the length direction of said automobile toward the front wheels or rear wheels from the center of the quadrilateral that connects the center of each of the four wheels of said automobile.

5. The tire monitoring device described in claim 4 wherein the first and second antennas are arranged at a distance shorter than the wavelength of said radio waves.

6. The tire monitoring device described in claim 1, wherein said first and second antennas are arranged such that the straight line connecting the first and second antennas is parallel with the length direction of said automobile and is offset in the width direction of said automobile toward the left wheels or right wheels from the center of the quadrilateral that connects the center of each of the four wheels of said automobile.

7. The tire monitoring device described in claim 6 wherein the first and second antennas are arranged at a distance shorter than the wavelength of said radio waves.

8. The tire monitoring device described in claim 1, wherein said sensor module includes a rotation direction sensor that can detect whether the rotation direction of the tire is clockwise or counterclockwise from the shaft of the wheel.

9. The tire monitoring device described in claim 1 wherein said sensor module includes a pressure sensor that detects the air pressure of the tire.

10. The tire monitoring device described in claim 1 wherein said sensor module includes a temperature sensor that detects the temperature of the tire.

11. The tire monitoring device described in claim 1 wherein the first and second antennas are arranged at a distance shorter than the wavelength of said radio waves.

12. The monitoring device described in claim 11, wherein the first and second antennas are arranged at a distance equal to ¼ of the wavelength of said radio waves.

13. The tire monitoring device described in claim 1 wherein said received radio wave phase difference detector comprises:

a first intermediate frequency converting circuit that converts the radio waves received by the first antenna to a first intermediate frequency signal having a prescribed intermediate frequency lower than the frequency of said radio waves;

a first amplifier circuit that amplifies the first intermediate frequency signal;

a second intermediate frequency converting circuit that converts the radio waves received by the second antenna to a second intermediate frequency signal having said intermediate frequency;

a second amplifier circuit that amplifies said second intermediate frequency signal; and a phase detecting circuit that detects the phase difference between the first intermediate frequency signal output from the first amplifier circuit and the second intermediate frequency signal output from the second amplifier circuit.

14. The tire monitoring device described in claim 1 wherein wheel judging part comprises:

a phase difference reference value setting part that sets and stores a phase difference reference value for each wheel beforehand based on equal phase difference curves specified between the first and second antennas; and a judging part that compares the detected phase difference value between the received radio waves obtained from said received radio wave phase difference detector with the phase difference reference value of each wheel, determines the phase difference reference value closest to said detected phase difference value, and judges the wheel corresponding to said determined phase difference reference value as the wheel whereon the tire of said radio wave radiation source is installed.

15. The tire monitoring device described in claim 1, wherein the first and second antennas are arranged at a distance shorter than the wavelength of said radio waves.

16. A tire problem detecting device that can detect a prescribed problem when it occurs on a tire installed on any wheel of an automobile based on information included in radio waves transmitted from a sensor module equipped tire, comprising:

first and second antennas installed at different positions on the body of said automobile to receive the radio waves transmitted from said sensor module with a phase difference between them, wherein said first and second antennas are arranged in a prescribed positional relationship such that different wheels of said automobile are set at different positions on equal phase difference curves specified in a quadrilateral that connects the center of each of the four wheels of said automobile;

a phase difference detector that detects the phase difference between the radio waves received by the first and second antennas; and a problem tire wheel position identification part that can identify which wheel has the tire with said prescribed problem.

17. The tire problem detecting device described in claim 16, wherein the first and second antennas are arranged at a distance shorter than the wavelength of said radio waves.

18. The tire detecting device described in claim 17, wherein the first and second antennas are arranged at a distance equal to ¼ of the wavelength of said radio waves.

* * * * *